Dec. 26, 1967     D. W. COLVIN     3,359,788

ULTRASONIC MEASUREMENT OF SOLUTION CONCENTRATION

Filed March 2, 1965     2 Sheets-Sheet 1

INVENTOR.
DONALD W. COLVIN

Dec. 26, 1967  D. W. COLVIN  3,359,788
ULTRASONIC MEASUREMENT OF SOLUTION CONCENTRATION
Filed March 2, 1965  2 Sheets-Sheet 2
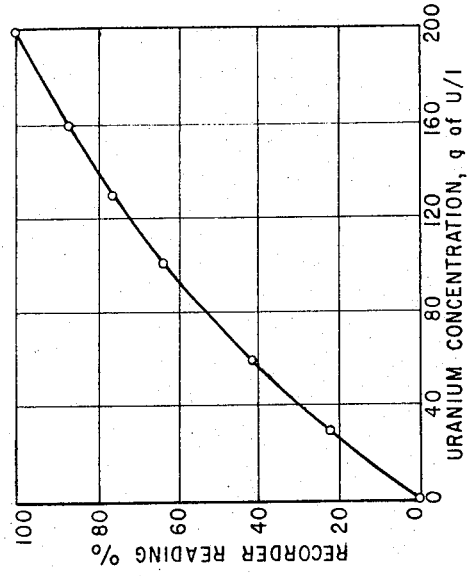
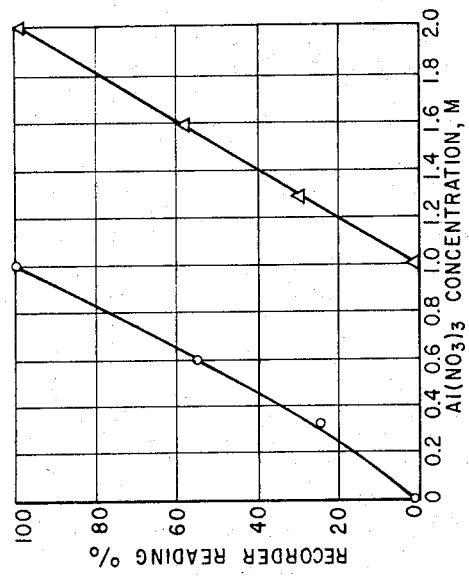
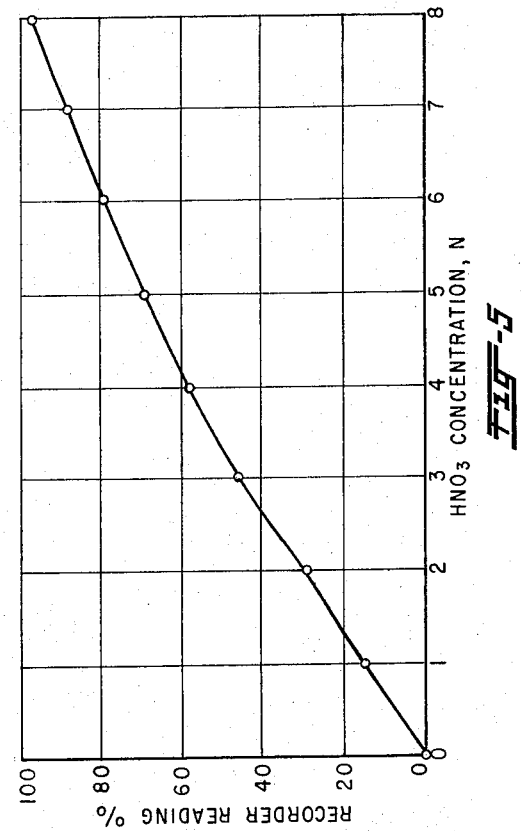
INVENTOR.
DONALD W. COLVIN
BY
Attorney:

United States Patent Office 3,359,788
Patented Dec. 26, 1967

3,359,788
ULTRASONIC MEASUREMENT OF SOLUTION CONCENTRATION
Donald W. Colvin, Clearwater, Fla., assignor to the United States of America as represented by the United States Atomic Energy Commission
Filed Mar. 2, 1965, Ser. No. 436,698
6 Claims. (Cl. 73—61.1)

ABSTRACT OF THE DISCLOSURE

The concentration of a chemical component in solution is determined by placing the solution in contact with one surface of an ultrasonic reflecting material within a cell provided with an ultrasonic transducer. The opposite surface of the reflecting material is in contact with air. Ultrasonic pulses are passed through the solution and the ratio of the amplitudes of the reflected pulses from the reflecting surfaces are compared to determine the relative concentration of a chemical component in the solution. The transducer is energized by a blocking oscillator and the reflected pulses are amplified, followed by sorting in a pulse sorter. The resulting voltage pulses which are proportional to the amplitudes of the reflected pulses are further amplified and their logarithms obtained. The difference in pulse voltage logarithms is taken in a recorder to determine the ratio of the amplitudes. The recorder is calibrated to indicate the relative solution concentration.

---

This invention relates to the ultrasonic measurement of chemical concentrations in solution and more particularly to an ultrasonic system for measuring the concentration of a chemical component in a solution.

In chemical process control it is often desirable to remotely monitor the chemical concentration of a particular solution or process stream on either a periodic or continuous basis. Of the methods in common use for measuring chemical concentration, pH measurement and electrical conductivity measurement are well known. The measurement of pH, however, is limited in that only the effective acidity or alkalinity of a process liquor may be determined and such a measurement is not useful in a process where changes in solution concentration do not also result in proportional changes in acidity or alkalinity. In conductivity measurement, the conductance of a solution is a function of all the ions present in the solution, but it is directly proportional to the concentration only over a limited range. For instance, the conductance of nitric acid is proportional to the acidity only up to a concentration of about 6 N where the conductivity of nitric acid reaches a maximum. Another disadvantage of conductivity measurements is that, as a result of the applied EMF, certain ions tend to build up on the electrodes, thereby causing incorrect conductivity readings.

In view of these difficulties with prior art methods of determining chemical concentration, an object of the present invention is to provide an ultrasonic technique for the chemical analysis of solutions.

Another object of the invention is to provide an ultrasonic reflection means for determining the concentration of a chemical in solution.

Still another object is to provide an ultrasonic means for determining the concentration of a single chemical component in solution.

A further object of this invention is to provide an ultrasonic method and apparatus for measuring the concentration of a chemical component of a multicomponent solution wherein all the chemical concentrations remain constant except the concentration of the component being determined.

A still further object is to provide an ultrasonic method and apparatus for continuously determining the chemical concentration of a chemical component in a chemical process stream.

In accordance with the present invention it has been found that an accurate determination of the concentration of a chemical component in solution may be obtained by comparing the ratio of the absolute amplitudes of ultrasonic pulses that are reflected from surfaces of an ultrasonic reflecting material of known specific acoustic impedance and passed through the solution, where one surface of the ultrasonic reflecting material is in contact with the solution and the other surface of the ultrasonic reflecting material is in contact with a gas. This determination of the concentration of the chemical component in solution is accomplished with a cell provided with an ultrasonic reflecting material and adapted to receive the solution to be determined. The ultrasonic reflecting material is disposed in the cell with one ultrasonic reflecting surface in contact with the solution and the other ultrasonic reflecting surface in contact with a gas. Means are provided for transmitting ultrasonic pulses through the solution so that a portion of the ultrasonic pulses are reflected by the ultrasonic reflecting surface in contact with the solution and another portion of the ultrasonic pulses are reflected by the ultrasonic reflecting surface in contact with a gas. Means are provided for detecting these reflected pulses which pass through the solution and for comparing the ratio of the amplitudes of the reflected pulses.

Using the present invention, changes in the specific acoustic impedance of the solution, which are proportional to changes in the solution concentration, provide a measure of the solution concentration. When a single chemical concentration is changing in the solution, the apparatus is calibrated to show changes in specific acoustic impedance of the solution in terms of the actual chemical concentration.

While it is not intended that this invention be limited to a particular theory or mathematical formula, the relationship of the ratio of the amplitudes of the reflected waves to the specific acoustic impedance of the solution and reflecting material is given by the following expression:

$$\frac{P_3}{P_1} = \frac{4z_1 z_2}{z_1^2 - z_2^2}$$

wherein $P_1$ is the absolute amplitude of the wave reflected from the ultrasonic reflecting surface in contact with the solution, $P_3$ is absolute amplitude of the wave reflected from the reflecting surface in contact with a gas and passing through the solution, $z_1$ is the specific acoustic impedance of the solution, and $z_2$ is the specific acoustic impedance of the ultrasonic reflecting material.

It will be evident that to obtain a measure of $z_1$ only $z_2$ is held constant. A solid ultrasonic reflecting material meets this requirement for a constant specific acoustic impedance. By taking the amplitude ratio of the pulses, the attenuation caused by the solution is cancelled and the initial pulse amplitude is eliminated. The attenuation in the reflecting material is constant.

Other objects, advantages and features of the present invention will become apparent to those skilled in the art from the following description of a preferred embodiment thereof, when read in connection with the following drawings, in which:

FIG. 3 shows illustrative calibration curves for the analysis of an aluminum nitrate solution over a concentration range of from 0 to 2 M.

FIG. 4 is an illustrative calibration curve for the analysis of uranium in uranyl nitrate solution over the concentration range of from 0 to 200 grams of uranium per liter.

FIG. 5 is an illustrative calibration curve for the analysis of nitric acid in the concentration range of from 0 to 8 N.

Figure 1:
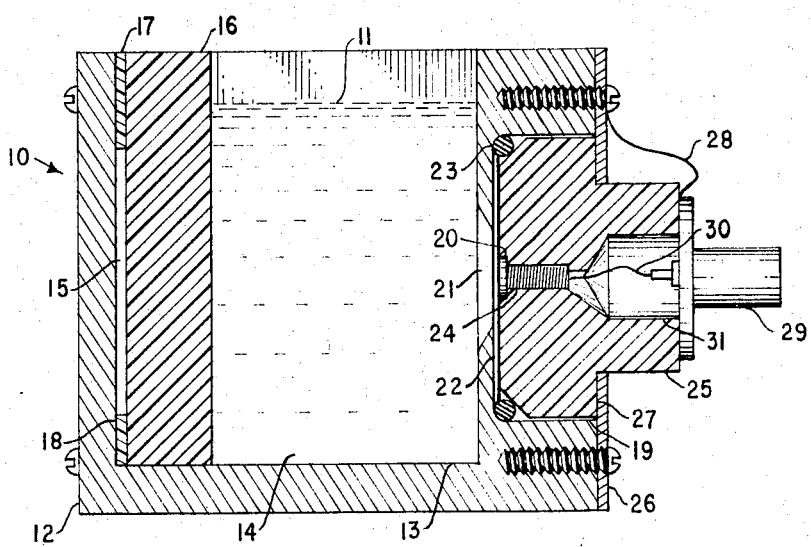
FIG. 1 is a side elevation, in section, of a sample cell of the type used in the present ultrasonic system for measuring solution concentration.

The present invention will now be described in detail with particular reference to FIG. 1 wherein is illustrated a sample cell 10 comprising essentially a vessel 12 having a cavity 13 of rectangular cross section divided into two compartments, a relatively large solution compartment 14 and an air compartment 15 of relatively small cross section. The compartments are divided by a vertically disposed plate member 16 made of an ultrasonic reflecting material, such as polymerized methyl methacrylate. The size of the air compartment 15 is not critical and it may be formed by separating the plate member 16 from the wall of cavity 13 with suitable spacers 17, 18. Spacers 17, 18, which may be made of any non-corrosive material, such as Teflon (a registered trademark of E. I. du Pont de Nemours and Company, Inc., Wilmington, Del.), also provide a seal to prevent leakage of solution 11 from the solution compartment 14 into the air compartment 15. Vessel 12, which may be made of any non-corrosive, electrical-conductive material, such as stainless steel, that is non-reactive with the solution to be determined, is provided with a transducer cavity 19 in the side wall opposite plate member 16. An ultrasonic transducer 20 is disposed in cavity 19 adjacent the center of opening 21 in said side wall of vessel 12. Opening 21 provides communication between said transducer cavity 19 and solution compartment 14.

Ultrasonic transducer 20, which may be of any suitable type, is mounted on a resonance disc 22 by means of an adhesive having electrical conductive properties. Resonance disc 22, preferably a thin, non-corrosive, electrical-conductive metal, such as stainless steel, which will serve as a ground connection for one face of the transducer 20, is held in place by means of an O ring 23 with ultrasonic transducer 20 adjacent the center of opening 21. Thus, one face of the transducer 20 is grounded by means of the conductive adhesive through resonance disc 22 to the body of vessel 12. The electrical connection to the other face of transducer 20 is made with a contact spring 24 disposed in a non-conductive plug 25 which is held in transducer cavity 19 by a washer 26 bearing on shoulder 27 of the plug and fastened to the side wall of vessel 12 by suitable means, such as screws. Washer 26 is made of a conductive material, such as stainless steel, and provides ground electrical contact with vessel 12. A first electrical lead 28 provides ground electrical connection between washer 26 and one terminal of electrical connector 29. A second electrical lead 30 which passes through opening opening 31 in plug 25 provides an electrical connection between the contact spring 24 and a second terminal of electrical connector 29. An electrical conductor (not shown) connects the electrical connector 29 to the electrical circuit hereinafter described and shown in FIG. 2.

While the selection of an ultrasonic reflecting material for plate member 16 is not critical, a number of factors must be considered, particularly the physical and chemical properties of the solutions to be determined. In practice the impedance of this solid reflecting material must be greater than the impedance of the liquid solution and to obtain the highest sensitivity in the measurement of $z_1$ (the specific acoustic impedance of the solution), the solid reflecting material selected should have a specific acoustic impedance ($z_2$) that is almost equal to $z_1$. For best results it has been found that the value of $z_2$ should be selected so that amplitudes of the two reflections do not differ by more than about a factor of two. These requirements may be met in the case of most solutions by the selection of a plastic material, such as polymerized methyl methacrylate, well known under the trade names Lucite and Plexiglas.

The width of the sample cell and the thickness of the reflecting plate are not critical but depend upon the desired time separation between pulses and the resonant frequency of the transducer. In the preferred embodiment, using a transducer having a resonant frequency of 3 megacycles/second, a cell width (distance between the reflecting face of plate 16 in contact with solution 11 and transducer 20) of about 1.5 inches provides a convenient time separation of about 50 microseconds between the initial pulse and the first reflected pulse and a reflecting plate thickness of about 0.5 inch provides a pulse separation of about 10 microseconds across the reflecting material.

Figure 2:
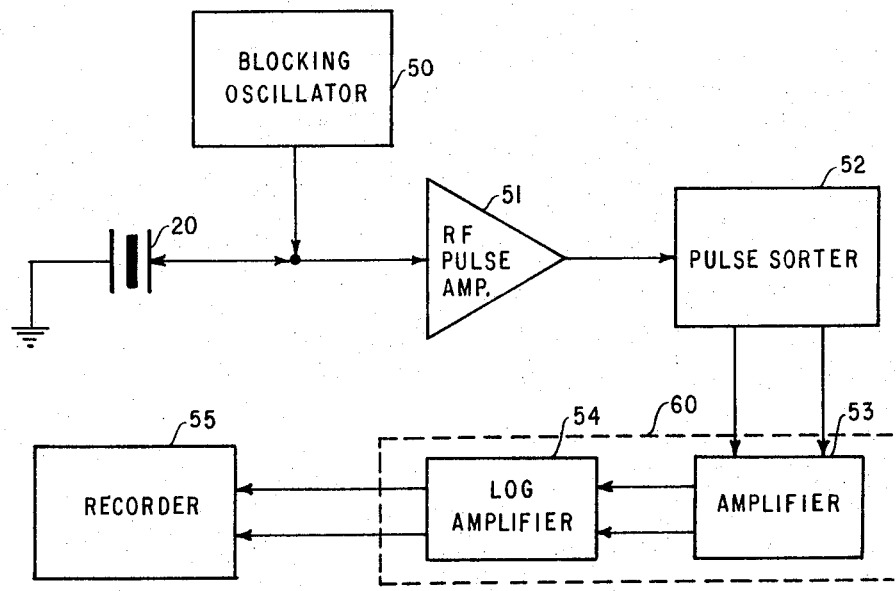
FIG. 2 is a block diagram showing the sample cell of FIG. 1 and the electronic circuit used in the preferred embodiment of this invention.

Since the individual electronic components are well known to those skilled in the art, the electronic circuit used with the sample cell of FIG. 1 is shown in FIG. 2 in block diagram. The ultrasonic transducer 20 disposed in the sample cell 10, as hereinabove described, is coupled via electrical connector 29 (FIG. 1) and a suitable electrical conductor to a blocking oscillator 50 and other associated readout electronic components shown in FIG. 2.

The transducer 20, which may be any suitable type, is energized by blocking oscillator 50. While the type and frequency of the transducer is not critical, a barium titanate piezoelectric transducer having an excitation frequency of 3 mc./sec. is suitable for the cell dimensions and for the circuit herein described.

In this preferred embodiment, the blocking oscillator 50 generates voltage pulses at a repetition rate of 2.8 kc./sec. to be applied to the transducer 20. These initial pulses "ring" the transducer at its resonant frequency of 3 mc./sec. to transmit initial ultrasonic pulses of this frequency through the solution toward the ultrasonic reflecting plate 16. Pulses which are reflected from the ultrasonic reflecting surface in contact with the solution and from the ultrasonic reflecting surface in contact with air (in air compartment 15) return through the solution to be detected by the same transducer 20. At the reflecting surface in contact with air the ultrasonic pulses will be almost completely reflected and their amplitude will be unchanged.

The readout electronic circuitry, which includes an RF pulse amplifier circuit 51, a pulse sorter circuit 52, a ratio circuit 60, and a recorder 55, is connected to receive both the initial pulse of the blocking oscillator 50 and the reflected pulses detected by transducer 20, and is adapted to measure the amplitude ratio of the two reflected pulses.

The RF pulse amplifier 51, a two-stage tuned amplifier well known in the art, is adapted to increase the voltage level or amplitude of the reflected pulses detected at the transducer 20 and to limit the amplitude of the initial "driving" pulse from the oscillator 50. The output is demodulated to obtain only the envelope of the initial 3 mc. pulse and the reflected pulses are amplified for input to the pulse sorter circuit 52.

The pulse sorter 52 comprises conventional switching and gating circuits capable of separating a plurality of pulses received from the output of the RF pulse amplifier 51. A pulse sorter is necessary because a number of voltage pulses, including the initial pulse, the desired reflected pulses and extraneous reflected pulses, appear at the output of the RF pulse amplifier 51. Although the gain control of RF amplifier 51 is adjusted so that the initial pulse is clipped and the reflected pulses are amplified with minimum distortion, the initial pulse may override the reflected pulses because of the short time separation between pulses. This results from the use of a relatively small sample cell hereinabove described. Further, it is necessary to separate the two reflected pulses from the initial pulse and from each other in order to perform the integration in the logarithmic amplifier 54 with subsequent subtraction of the resulting voltages using the recorder 55 to obtain the amplitude ratio desired. In this preferred embodiment, transistorized digital module circuits, such as those manufactured by the Computer Control Co., Inc., Framingham, Mass., are used to provide the instantaneous switching and gating characteristics required to separate the two reflected pulses from each other and from the other pulses appearing at the output of the RF amplifier 51. The pulses are separated by three transistor switches having associated multivibrators and flip-flop circuits to achieve the desired gating. A first switch is connected in parallel with the multivibrators and in series with second and third transistor switches that are connected in parallel. The pulse sorter operation is initiated by the arrival of the initial pulse at a multivibrator and the subsequent generation of a gate pulse that envelops (in time) the two desired reflected pulses. The gate pulse turns on the the first and second transistor switches and allows the two reflected pulses to appear at the input of the second and third switches. A second gate pulse envelops only the first reflected pulse and allows it to pass through the second switch and a third gate pulse envelops only the second reflected pulse and allows it to pass through the third switch. At the same time the circuit is reset for the next cycle. The outputs of the second and third switches, i.e. the first and second reflected pulses, respectively, are then each applied to amplification and logarithmic circuits in the ratio circuit 60. The first transistor switch uses the basic circuit described by Bright, R. L. in Trans. Am. Inst. Elect. Eng. 74 pt. 1, 111–21 (March 1955) and the second and third transistor switches are standard modules No. EF101 manufactured by the Computor Control Co., Inc. of Framingham, Mass.

The ratio circuit 60 comprises an amplifier 53 and a logarithmic amplifier 54 each having a channel for the first and the second reflected pulses respectively, from the pulse sorter circuit 52. Each pulse is first amplified in the amplifier circuit 53 and is then integrated in the logarithmic amplifier 54 to obtain a D.C. voltage. The logarithmic amplifier 54 operates by automatically adjusting the grid bias on the tube so that the circuit voltage gain is decreased with increasing signal voltage. In this preferred embodiment, the logarithmic amplifier 54 operates over an input range of from about 2 to about 10 volts. The D.C. voltage outputs for each reflected pulse from the logarithmic amplifier are then applied to a suitable recorder 55. The recorder 55 is adapted to take the difference of the two D.C. voltages each of which is the logarithm of the original pulse signal from the pulse sorter 52. Since the difference of the logarithms of the reflected pulse signals is the ratio and this ratio is a measure of the amplitude ratio of the two reflected pulses, an indication of relative changes in solution concentration is provided. For this preferred embodiment, a suitable recorder is a Varian Recorder, manufactured by Varian Associates, Palo Alto, Calif., having a range of from about −12.5 to 12.5 mv.

The operation of the present invention will be apparent to those skilled in the art from the foregoing description. The solution compartment 14 of sample cell 10 is filled with a solution 11, the concentration of which is to be determined. Connection between the ultrasonic transducer 20 and the blocking oscillator 50 is provided by electrical leads 28 and 30, electrical connector 29, and an external electrical conductor. Blocking oscillator 50 is energized to continuously send pulses to tranducer 20 which in turn transmits "ringing" bursts of energy through the solution in the direction of ultrasonic reflecting plate 16. Pulses reflected from the reflecting surface in contact with the solution and from the reflecting surface in contact with air, respectively, return through the solution and are detected by ultrasonic transducer 20. These reflected pulses are amplified in the RF pulse amplifier 51 and separated from each other and from the initial pulse in the pulse sorter 52 where the output provides voltages proportional to the amplitudes of each of the reflected pulses. The pulses are further amplified and their ratios taken by first obtaining the logarithm of the two pulse signals in the ratio circuit 60 and then obtaining their difference in the recorder 55. The recorder 55 is calibrated to indicate solution concentration and the relative changes that occur therein.

FIGURES 3, 4, and 5 show examples of calibration curves of three solutions over different concentration ranges. The calibration curves are made by alternately filling the sample cell with standard solutions of minimum and maximum concentrations and adjusting the range controls. Maximum accuracy is obtained by using a number of other solutions of known concentrations in between the maximum and minimum to complete the curve. FIGURE 3 shows two curves for use with aluminum nitrate solutions in the concentration ranges from 0 to 1 M and from 1 M to 2 M. The error in this calibration, resulting from noise and drift, is less than ±1% of the span of the recorder, which is equivalent to a concentration error of 0.01 M aluminum nitrate.

FIGURE 4 shows a calibration for uranyl nitrate solution over the concentration range from 0 to 200 grams of uranium per liter. The error is ±2% over the recorder span.

In FIGURE 5, calibrations of nitric acid were made from 0 to 8 N are shown, and the curve represents this range with a negligible error (<1%) from combined noise and drift.

By continuously flowing the solution to be determined through the sample cell, the concentration of the solution may be determined continuously over a previously established concentration range. Thus, the present invention may be used to continuously monitor the concentration of a chemical process or reagent stream having a single chemical component in solutions having multiple components where the relative proportions of all components, except the one to be determined, remain constant.

It is not intended that this invention be limited to the specific embodiments described and illustrated in the foregoing specification but only by the scope of the appended claims.

What is claimed is:
1. A method for determining the concentration of a chemical component in solution which comprises:
  (a) placing said solution in a cell provided with an ultrasonic reflecting material having a first ultrasonic reflecting surface in contact with said solution and a second ultrasonic reflecting surface in contact with a gas;
  (b) transmitting ultrasonic pulses through said solution whereby said pulses are reflected through said solution by said first and second ultrasonic reflecting surfaces;
  (c) detecting the ultrasonic pulses reflected from said first and second ultrasonic reflecting surfaces; and
  (d) comparing the ratio of the amplitudes of said reflections to determine the concentration of said chemical component in said solution.
2. A method for determining the concentration of a chemical component in solution which comprises:
  (a) placing said solution in a cell provided with an ultrasonic reflecting material, having a first ultrasonic reflecting surface in contact with said solution and a second ultrasonic reflecting surface in contact with air;
  (b) an ultrasonic transducer disposed opposite said ultrasonic reflecting material;
  (c) transmitting ultrasonic pulses from said transducer through said solution in the direction of said ultrasonic reflecting material, whereby said pulses are reflected through said solution by said first and second ultrasonic reflecting surfaces;
  (d) detecting the ultrasonic pulses reflected from said first and second ultrasonic reflecting surfaces; and
  (e) comparing the ratio of the amplitudes of said reflections to determine the concentration of said chemical component in said solution.

3. An apparatus for determining the concentration of a chemical component in solution which comprises:
   (a) a cell adapted to receive said solution and provided with an ultrasonic reflecting material, said material having
      (1) a first ultrasonic reflecting surface in contact with said solution and
      (2) a second ultrasonic reflecting surface in contact with a gas;
   (b) means for transmitting ultrasonic pulses through said solution, whereby said pulses are reflected by said first and second ultrasonic reflecting surfaces;
   (c) means for detecting said reflected ultrasonic pulses; and
   (d) means for comparing the ratio of the amplitudes of said reflected pulses to determine the concentration of said chemical component in said solution.

4. An apparatus for determining the concentration of a chemical component in solution which comprises:
   (a) a cell adapted to receive said solution;
   (b) an ultrasonic reflecting material disposed in said cell having
      (1) a first ultrasonic reflecting surface in contact with said solution and
      (2) a second ultrasonic reflecting surface in contact with air;
   (c) an ultrasonic transducer disposed in said cell opposite said ultrasonic reflecting material, said ultrasonic transducer being adapted
      (1) to transmit ultrasonic pulses through said solution to said ultrasonic reflecting material and
      (2) to detect pulses reefleted from said first and second ultrasonic reflecting surfaces;
   (d) means for energizing said transducer; and
   (e) means for comparing the ratio of the amplitudes of said reflected pulses to indicate the concentration of said chemical component in said solution.

5. An apparatus for determining the concentration of a chemical component in solution which comprises:
   (a) a cell adapted to receive said solution;
   (b) an ultrasonic reflecting material disposed in said cell having
      (1) a first ultrasonic reflecting surface in contact with said solution and
      (2) a second ultrasonic reflecting surface in contact with air;
   (c) an ultrasonic transducer disposed in said cell opposite said reflecting material, said transducer being adapted
      (1) to transmit ultrasonic pulses through said solution to the reflecting surfaces of said material and
      (2) to detect pulses reflected from said first and second ultrasonic reflecting surfaces;
   (d) means for energizing said transducer;
   (e) means for separating said pulses;
   (f) means for determining the logarithms of said separated reflected pulses; and
   (g) means for taking the difference between said logarithms to measure the amplitude ratio of said reflected pulses, thereby indicating the relative solution concentration of said chemical components.

6. An apparatus for determining the concentration of a chemical component in solution which comprises:
   (a) a cell adapted to receive said solution;
   (b) an ultrasonic reflecting material vertically disposed in said cell having a first ultrasonic reflecting surface in contact with said solution and a second ultrasonic reflecting surface in contact with air;
   (c) an ultrasonic transducer disposed in said cell opposite the first ultrasonic reflecting surface of said material, said transducer being adapted
      (1) to direct ultrasonic pulses through said solution to said reflecting material and
      (2) to receive pulses reflected from said first and second ultrasonic reflecting surfaces;
   (d) oscillator means for energizing said transducer to transmit ultrasonic pulses;
   (e) means including said transducer for detecting and amplifying said reflected pulses;
   (f) pulse sorter means for separating said pulses;
   (g) ratio circuit means for determining the logarithms of said separated reflected pulses; and
   (h) recorder means for taking the difference between the logarithms of the reflected pulses to provide a measure of the amplitude ratio of said reflected pulses, thereby indicating the relative solution concentration of said chemical component.

References Cited

UNITED STATES PATENTS

| | | | |
|---|---|---|---|
| 2,926,522 | 3/1960 | Kritz | 73—32 |
| 2,966,057 | 12/1960 | Heller | 73—67.6 |
| 3,194,057 | 7/1965 | Richard | 63—67.5 X |

RICHARD C. QUEISSER, *Primary Examiner.*

JOHN P. BEAUCHAMP, *Assistant Examiner.*